(12) United States Patent
Johnson et al.

(10) Patent No.: US 7,632,412 B2
(45) Date of Patent: Dec. 15, 2009

(54) METHOD FOR CHEMISTRY CONTROL IN COOLING SYSTEMS

(75) Inventors: Donald A. Johnson, Batavia, IL (US); Steven R. Hatch, Naperville, IL (US); Arthur J. Kahaian, Chicago, IL (US)

(73) Assignee: Nalco Company, Naperville, IL (US)

( * ) Notice: Subject to any disclaimer, the term of this patent is extended or adjusted under 35 U.S.C. 154(b) by 420 days.

(21) Appl. No.: 11/556,391

(22) Filed: Nov. 3, 2006

(65) Prior Publication Data

US 2008/0105621 A1   May 8, 2008

(51) Int. Cl.
*C02F 1/42* (2006.01)
(52) U.S. Cl. ............... 210/662; 210/687; 210/743; 210/746
(58) Field of Classification Search ......... 210/662, 210/687, 743, 746
See application file for complete search history.

(56) References Cited

U.S. PATENT DOCUMENTS

| | | | | |
|---|---|---|---|---|
| 4,427,553 | A | * | 1/1984 | Fore ............... 210/743 |
| 4,532,045 | A | * | 7/1985 | Littmann ............ 210/668 |
| 4,648,043 | A | | 3/1987 | O'Leary |
| 4,931,187 | A | * | 6/1990 | Derham et al. ......... 210/662 |
| 5,057,229 | A | * | 10/1991 | Schulenburg et al. ..... 210/743 |
| 5,730,879 | A | | 3/1998 | Wilding et al. |
| 6,746,609 | B2 | | 6/2004 | Stander |

2006/0096930 A1   5/2006   Beardwood

FOREIGN PATENT DOCUMENTS

EP          325046 A   *   7/1989   ............ 210/662

OTHER PUBLICATIONS

Kemmer, F. N., ed. The NALCO Water Handbook, 2$^{nd}$ ed. New York: McGraw-Hill, 1988, ISBN 0070458723 pp. 12.19, 38.12, and 38.29.

* cited by examiner

*Primary Examiner*—Matthew O Savage
(74) *Attorney, Agent, or Firm*—Peter A. DiMattia; Michael B. Martin

(57) ABSTRACT

A method for controlling a cooling water tower comprising: providing a cooling tower system, which includes a recirculated evaporative cooling water stream, a source of make-up water, an evaporative cooling unit, a heat exchanger, a bleed off line, and a bleed-off valve which is in communication with said bleed-off line; providing a plurality of conduits through which said makeup water flows into said evaporative cooling water stream, wherein there is at least a first conduit that contains a weak acid cation ion exchange column and a second conduit that does not contain a weak acid ion exchange column, and wherein each conduit has at least one conduit valve; choosing a pH and a conductivity setpoint value and a deadband value above and below said setpoint value in said cooling tower system; measuring both the pH of said evaporative cooling water stream with one or more pH meters and conductivity of said evaporative cooling water stream with one or more conductivity meters; and implementing a response to said conductivity measurements and pH measurements is disclosed.

7 Claims, No Drawings

METHOD FOR CHEMISTRY CONTROL IN COOLING SYSTEMS

BACKGROUND

Cooling tower systems are subjected to stress during their operation. Two stresses are mineral scale buildup and pH variances in the cooling water system. Specifically, as the water in a cooling system dissipates heat by evaporation, the components of mineral scale in the remaining water become more concentrated, causing precipitation of the mineral scale on the internals of the cooling tower system, creating operational problems. Adding to the problem is the desorption of carbon dioxide, which results in an increase in pH.

A conductivity meter is usually used to monitor the potential for mineral scale buildup in a cooling tower system. When the cooling tower system cycles up, the concentration of ions such as $Ca^{++}$ and $Mg^{++}$ increase in concentration. To combat this stress the cooling tower system is blown down and makeup water is added back into the system.

The pH of water in cooling tower systems is often controlled by the injection of a strong acid, resulting in reduction of the saturation level of pH sensitive mineral scales. Although the addition of a strong acid is inexpensive and simple, this methodology has many disadvantages which include the following: (1) a malfunction of the controller can result in acid overfeed, producing an acidic water, which can cause severe corrosion damage to the system; (2) the addition of a strong acid results in a buildup of the counter ion of the acid, which can contribute to other forms of scaling and to corrosion; (3) operation of the pH control system requires the handling of strong acids such as dangerous mineral acids; and (4) cations such as $Ca^{++}$ and $Mg^{++}$ which also contribute to scale formation are not removed from the system.

An efficient protocol for controlling a cooling system that deals with both pH and mineral/scale buildup is thus desired.

SUMMARY OF THE INVENTION

The present provides for a method for controlling a cooling water tower comprising: (a) providing a cooling tower system, which includes a recirculated evaporative cooling water stream, a source of make-up water, an evaporative cooling unit, a heat exchanger, a bleed off line, and a bleed-off valve which is in communication with said bleed-off line; (b) providing a plurality of conduits through which said makeup water flows into said evaporative cooling water stream, wherein there is at least a first conduit that contains a weak acid cation ion exchange column and a second conduit that does not contain a weak acid ion exchange column, and wherein each conduit has at least one conduit valve; (c) choosing a pH and a conductivity setpoint value and a deadband value above and below said setpoint value in said cooling tower system; (d) measuring both the pH of said evaporative cooling water stream with one or more pH meters and conductivity of said evaporative cooling water stream with one or more conductivity meters; (e) implementing the following response to said conductivity measurements and pH measurements: (i) if the conductivity is C1 and the pH is P1, then said bleed-off valve is on and water is blowdown from said cooling tower until said evaporative cooling water stream reaches a first predetermined level, and makeup water is added to said evaporative cooling water stream through said first conduit until said evaporative cooling water stream reaches a second predetermined level; or (ii) if the conductivity is C1 and the pH is P2, then said bleed-off valve is on and water is blowdown from said cooling tower until said evaporative cooling water stream reaches a first predetermined level, and makeup water is added to said evaporative cooling water stream through said second conduit until said evaporative cooling water stream reaches a second predetermined level; or (iii) if the conductivity is C1 and the pH is P3, then said bleed-off valve is on and water is blowdown from said cooling tower until said evaporative cooling water stream reaches a first predetermined level, and makeup water is added to said evaporative cooling water stream through said second conduit until said evaporative cooling water stream reaches a second predetermined level; or (iv) if the conductivity is C2 and the pH is P1, then the bleed-off valve is on when the conductivity is falling from C1 and water is blowdown from said cooling tower until said evaporative cooling water stream reaches a first predetermined level, and makeup water is added to said evaporative cooling water stream through said first conduit until said evaporative cooling water stream reaches a second predetermined level; or (v) if the conductivity is C2 and the pH is P2, then the bleed-off valve is on when the conductivity is falling from C1 and water is blowdown from said cooling tower until said evaporative cooling water stream reaches a first predetermined level, and makeup water is added to said evaporative cooling water stream through said second conduit until said evaporative cooling water stream reaches a second predetermined level; or (vi) if the conductivity is C2 and the pH is P3, then the bleed-off valve is on when the conductivity is falling from C1 and water is blowdown from said cooling tower until said evaporative cooling water stream reaches a first predetermined level, and makeup water is added to said evaporative cooling water stream through said second conduit until said evaporative cooling water stream reaches a second predetermined level; or (vii) if the conductivity is C3 and the pH is P1, then said bleed-off valve is on and water is blowdown from said cooling tower until said evaporative cooling water stream reaches a first predetermined level, and makeup water is added to said evaporative cooling water stream through said first conduit until said evaporative cooling water stream reaches a second predetermined level; (viii) if the conductivity is C3 and the pH is P2, then the bleed-off valve is off; or (ix) if the conductivity is C3 and the pH is P3, then the bleed-off valve is off.

DETAILED DESCRIPTION OF THE INVENTION

Definitions $C_1$ is the conductivity value when conductivity is greater than sum of the setpoint value and deadband value.

$C_2$ is the conductivity value when conductivity is less than the sum of the setpoint value and deadband value and higher than the setpoint value less the deadband value.

$C_3$ is the conductivity value when conductivity is less than the setpoint value lowered by the deadband value.

$P_1$ is the pH value when the pH is greater than sum of the setpoint value and deadband value.

$P_2$ is the pH value when pH is less than the sum of the setpoint value and deadband value and higher than the setpoint value less the deadband value.

$P_3$ is the pH value when pH is less than the setpoint value lowered by the deadband value.

Preferred Embodiments

Optimum operating conditions for cooling tower systems vary from cooling tower to cooling tower. More specifically, optimum pH and conductivity ranges for cooling towers depend upon the type of cooling tower system and what the cooling tower system is being used for. The methodology of the present invention calls for choosing setpoint values and deadband values for pH and conductivity so that the cooling tower system can operate as efficiently and as practically as possible.

One or more pH meters and conductivity meters may be aligned in various ways to measure these parameters in a cooling tower system, which would be apparent to one of ordinary skill in the art. For example, a side stream may be taken from the system and pH and conductivity may be measured via the use of a flow cell.

The present invention utilizes a weak acid cation ion exchange column to control both pH and scale formation. There are various types of weak acid cation ion exchange column known to those of ordinary skill in the art that may be utilized for this invention. In one embodiment, the first conduit, which contains a weak acid cation exchange column is capable of absorbing $Ca^{++}$ and $Mg^{++}$. The ion exchange column may regenerated or replaced on an as needed basis.

A set of instructions has been established to deal with system pH and conductivity changes in the cooling tower system. The set of instructions include the following parameters:

(i) if the conductivity is C1 and the pH is P1, then said bleed-off valve is on and water is blowdown from said cooling tower until said evaporative cooling water stream reaches a first predetermined level, and makeup water is added to said evaporative cooling water stream through said first conduit until said evaporative cooling water stream reaches a second predetermined level; or (ii) if the conductivity is C1 and the pH is P2, then said bleed-off valve is on and water is blowdown from said cooling tower until said evaporative cooling water stream reaches a first predetermined level, and makeup water is added to said evaporative cooling water stream through said second conduit until said evaporative cooling water stream reaches a second predetermined level; or (iii) if the conductivity is C1 and the pH is P3, then said bleed-off valve is on and water is blowdown from said cooling tower until said evaporative cooling water stream reaches a first predetermined level, and makeup water is added to said evaporative cooling water stream through said second conduit until said evaporative cooling water stream reaches a second predetermined level; or (iv) if the conductivity is C2 and the pH is P1, then the bleed-off valve is on when the conductivity is falling from C1 and water is blowdown from said cooling tower until said evaporative cooling water stream reaches a first predetermined level, and makeup water is added to said evaporative cooling water stream through said first conduit until said evaporative cooling water stream reaches a second predetermined level; or (v) if the conductivity is C2 and the pH is P2, then the bleed-off valve is on when the conductivity is falling from C1 and water is blowdown from said cooling tower until said evaporative cooling water stream reaches a first predetermined level, and makeup water is added to said evaporative cooling water stream through said second conduit until said evaporative cooling water stream reaches a second predetermined level; or (vi) if the conductivity is C2 and the pH is P3, then the bleed-off valve is on when the conductivity is falling from C1 and water is blowdown from said cooling tower until said evaporative cooling water stream reaches a first predetermined level, and makeup water is added to said evaporative cooling water stream through said second conduit until said evaporative cooling water stream reaches a second predetermined level; or (vii) if the conductivity is C3 and the pH is P1, then said bleed-off valve is on and water is blowdown from said cooling tower until said evaporative cooling water reaches a first predetermined level, and makeup water is added to said evaporative cooling water stream through said first conduit until said evaporative cooling water stream reaches a second predetermined level;

(viii) if the conductivity is C3 and the pH is P2, then the bleed-off valve is off; or (ix) if the conductivity is C3 and the pH is P3, then the bleed-off valve is off.

When blowdown occurs the bleed-off valve is on and water from the evaporative cooling water stream is released until the level of water in the evaporative cooling water stream reaches a certain level, a first predetermined level. This mechanism can be controlled by the use of a float valve.

After water is blowndown from the system, makeup water needs to be added back into the evaporative cooling water stream. The makeup water enters the cooling tower system through one or more conduits. At least one of the conduits contains a weak acid cation ion exchange column and at least one conduit does not. With respect to plumbing, the orientation of the plurality of conduits can be arranged in a series of ways that would be apparent to one of ordinary skill in the art. Valves are attached to these conduits so that water passage through the right conduits can be controlled. A solenoid may be attached to these valves so that the system can be actuated in accordance to the cooling water tower systems set of instructions.

To automate the process of monitoring or make the methodology an on-line process, a controller is utilized. In one embodiment, one or more controllers are in communication with one or more pH meters and conductivity meters, wherein said controllers are programmed to implement a response to said pH measurements and conductivity measurements. In a further embodiment, the controllers are in communication with said plurality of conduits. In yet a further embodiment, the controllers are in communication with said first conduit and/or second conduit.

One or more solenoids may be attached to one or more of said plurality of conduits and said controller is in communication with said solenoids. For example, a signal can be sent to one or more solenoids to force makeup water to enter the evaporation cooling water system through said weak acid lotion ion exchange column.

The controllers may be web-based so that data can be viewed remotely and/or the control logic can be altered remotely.

We claim:

1. A method for controlling a cooling water tower comprising:
   a. providing a cooling tower system, which includes a recirculated evaporative cooling water stream defined by an evaporative cooling water volume, a source of make-up water, an evaporative cooling unit, a heat exchanger, a bleed off line, and a bleed-off valve which is in communication with said bleed-off line;
   b. providing a plurality of conduits through which said makeup water flows into said evaporative cooling water stream, wherein there is at least a first conduit that contains a weak acid cation ion exchange column and a second conduit that does not contain a weak acid ion exchange column, and wherein each conduit has at least one conduit valve;

c. choosing a pH setpoint value, a conductivity setpoint value and a deadband value above and below said pH setpoint value, a deadband value above and below said conductivity setpoint value, in said cooling tower system;

d. defining conductivity values C1-C3 and pH values P1-P3, wherein

C1 is the conductivity value when conductivity is greater than sum of the setpoint value and deadband value, C2 is the conductivity value when conductivity is less than the sum of the setpoint value and deadband value and higher than the setpoint value less the deadband value, C3 is the conductivity value when conductivity is less than the setpoint value lowered by the deadband value, P1 is the pH value when the pH is greater than sum of the setpoint value and deadband value, P2 is the pH value when pH is less than the sum of the setpoint value and deadband value and higher than the setpoint value less the deadband value, P3 is the pH value when pH is less than the setpoint value lowered by the deadband value;

e. measuring both the pH of said evaporative cooling water stream with one or more pH meters and conductivity of said evaporative cooling water stream with one or more conductivity meters;

f. implementing the following response to said conductivity measurements and pH measurements:

(i) if the conductivity is C1 and the pH is PI, then said bleed-offvalve is on and water is blowdown from said cooling tower until said evaporative cooling water volume reaches a first predetermined level, and makeup water is added to said evaporative cooling water stream through said first conduit until said evaporative cooling water volume reaches a second predetermined level; or (ii) if the conductivity is C1 and the pH is P2, then said bleed-offvalve is on and water is blowdown from said cooling tower until said evaporative cooling water volume reaches a first predetermined level, and makeup water is added to said evaporative cooling water stream through said second conduit until said evaporative cooling water volume reaches a second predetermined level; or (iii) if the conductivity is C1 and the pH is P3, then said bleed-offvalve is on and water is blowdown from said cooling tower until said evaporative cooling water volume reaches a first predetermined level, and makeup water is added to said evaporative cooling water stream through said second conduit until said evaporative cooling water volume reaches a second predetermined level; or (iv) if the conductivity is C2 and the pH is P1, then the bleed-off valve is on when the conductivity is falling from C1 and water is blowdown from said cooling tower until said evaporative cooling water volume reaches a first predetermined level, and makeup water is added to said evaporative cooling water stream through said first conduit until said evaporative cooling water volume reaches a second predetermined level; or (v) if the conductivity is C2 and the pH is P2, then the bleed-offvalve is on when the conductivity is falling from CI and water is blowdown from said cooling tower until said evaporative cooling water volume reaches a first predetermined level, and makeup water is added to said evaporative cooling water stream through said second conduit until said evaporative cooling water volume reaches a second predetermined level; or (vi) if the conductivity is C2 and the pH is P3, then the bleed-offvalve is on when the conductivity is falling from C1 and water is blowdown from said cooling tower until said evaporative cooling water volume reaches a first predetermined level, and makeup water is added to said evaporative cooling water stream through said second conduit until said evaporative cooling water volume reaches a second predetermined level; or (vii) if the conductivity is C3 and the pH is P1, then said bleed-off valve is on and water is blowdown from said cooling tower until said evaporative cooling water volume reaches a first predetermined level, and makeup water is added to said evaporative cooling water stream through said first conduit until said evaporative cooling water volume reaches a second predetermined level;

(viii) if the conductivity is C3 and the pH is P2, then the bleed-offvalve is off; or (ix) if the conductivity is C3 and the pH is P3, then the bleed-offvalve is off.

2. The method of claim 1 further comprising one or more controllers which are in communication with said pH meters and said conductivity meters, wherein said controllers are programmed to implement said response to said pH measurements and said conductivity measurements.

3. The method of claim 2 wherein said controllers are web-based.

4. The method of claim 2 wherein said at least one conduit valve in the first conduit includes said first conduit having a first valve attached to it and said at least one conduit valve in the second conduit includes said second conduit having a second valve attached to it.

5. The method of claim 4 wherein said first valve and/or said second valve has a solenoid that receives input from said controllers and implements a response in accord with said programmed controllers.

6. The method of claim 1 wherein said weak acid cation exchange column absorbs Ca++ and Mg++ cations.

7. The method of claim 1 wherein said first predetermined level and said second predetermined level are controlled by a float valve.

* * * * *